US011892837B2

(12) United States Patent
Pandita et al.

(10) Patent No.: US 11,892,837 B2
(45) Date of Patent: Feb. 6, 2024

(54) TELEMATICS SYSTEM AND METHOD FOR CONDITIONAL REMOTE STARTING OF SELF-PROPELLED WORK VEHICLES

(71) Applicant: Deere & Company, Moline, IL (US)

(72) Inventors: Kirti Pandita, Pune (IN); Lance R. Sherlock, Asbury, IA (US)

(73) Assignee: Deere & Company, Moline, IL (US)

( * ) Notice: Subject to any disclaimer, the term of this patent is extended or adjusted under 35 U.S.C. 154(b) by 109 days.

(21) Appl. No.: 17/346,327

(22) Filed: Jun. 14, 2021

(65) Prior Publication Data

US 2022/0397897 A1   Dec. 15, 2022

(51) Int. Cl.
*G05D 1/00* (2006.01)
*G05D 1/02* (2020.01)
*G06V 20/56* (2022.01)
*G06V 20/59* (2022.01)

(52) U.S. Cl.
CPC ......... *G05D 1/0038* (2013.01); *G05D 1/0016* (2013.01); *G05D 1/0231* (2013.01); *G06V 20/56* (2022.01); *G06V 20/59* (2022.01)

(58) Field of Classification Search
CPC .. G05D 1/0038; G05D 1/0016; G05D 1/0231; G06V 20/56; G06V 20/59
See application file for complete search history.

(56) References Cited

U.S. PATENT DOCUMENTS

| 7,092,802 B2 | 8/2006 | Baldassa |
| 7,671,725 B2 | 3/2010 | Tsuji et al. |
| 8,954,252 B1 | 2/2015 | Urmson et al. |
| 9,561,779 B2 | 2/2017 | Rasal |
| 9,712,791 B2 | 7/2017 | Kim et al. |

(Continued)

FOREIGN PATENT DOCUMENTS

| DE | 102019113703 A1 | * | 2/2020 | ............. B60R 25/04 |
| JP | 6238038 B1 | * | 11/2017 | ......... B60R 16/0231 |
| WO | 2020175758 A1 | | 9/2020 | |

OTHER PUBLICATIONS

Taku, Machine translation of JP-6238038-B1 (Year: 2017).*
Cowing, Machine translation of DE-102019113703-A1 (Year: 2020).*

*Primary Examiner* — Anne Marie Antonucci
*Assistant Examiner* — Patrick Daniel Mohl
(74) *Attorney, Agent, or Firm* — Gary L. Montle; Lucian Wayne Beavers; Patterson Intellectual Property Law, PC

(57) ABSTRACT

A remote starting system and method are provided for self-propelled work vehicles having work attachments supported from a main frame thereof. Cameras are arranged with respective fields of vision proximate to the work vehicle, and a communications unit is configured to exchange messages with a user device via a communications network. A local or remote controller is configured to receive first user input comprising a remote startup request for the work vehicle from the user device, and to automatically detect parameters respectively associated with predetermined remote startup conditions, at least one of the parameters comprising images obtained from the cameras. The images are transmitted to the user device, responsive to which second user input is received comprising remote startup confirmation from the user device via the communications network. Responsive to at least the second user input, engine startup is automatically controlled for the work vehicle.

18 Claims, 7 Drawing Sheets

(56) References Cited

U.S. PATENT DOCUMENTS

| | | |
|---|---|---|
| 9,744,941 B2 | 8/2017 | Geissenhoner |
| 9,908,385 B2 | 3/2018 | Chundrlik, Jr. et al. |
| 10,018,171 B1* | 7/2018 | Breiner ............... F02N 11/0818 |
| 10,479,354 B2 | 11/2019 | Posselius et al. |
| 10,814,785 B2 | 10/2020 | Lynam |
| 2010/0072290 A1* | 3/2010 | Dage .................... B60N 2/5678 |
| | | 236/51 |
| 2017/0131722 A1 | 5/2017 | Hiramatsu et al. |
| 2017/0135277 A1 | 5/2017 | Hiramatsu et al. |
| 2017/0174129 A1* | 6/2017 | Chin ................ G08G 1/096716 |
| 2018/0035050 A1 | 2/2018 | Lu et al. |
| 2018/0050575 A1* | 2/2018 | Campbell ............ G01N 33/004 |
| 2020/0355151 A1* | 11/2020 | Chaya ................ B60H 1/00785 |
| 2022/0137616 A1* | 5/2022 | Martin .................. F01N 13/087 |
| | | 701/2 |

* cited by examiner

TELEMATICS SYSTEM AND METHOD FOR CONDITIONAL REMOTE STARTING OF SELF-PROPELLED WORK VEHICLES

FIELD OF THE DISCLOSURE

The present disclosure relates generally to self-propelled work vehicles, and more particularly to systems and methods for automated remote starting of such self-propelled work vehicles using condition detection tools such as for example an onboard camera system.

BACKGROUND

Self-propelled work vehicles as discussed herein may particularly refer to excavator machines for illustrative purposes, but may also for example include forestry machines, front shovel machines, and other equipment which modify the terrain or equivalent working environment in some way. These work vehicles may have tracked or wheeled ground engaging units supporting the undercarriage from the ground surface and may further include one or more work attachments comprising work implements that are movable with respect to the work vehicle by various actuators in order to accomplish tasks with the implement. In the context of an excavator machine as an exemplary work vehicle, the corresponding moving implements may be configured as a boom, an arm, a bucket, and the like (collectively a boom assembly), with actuators for moving the implements generally configured as hydraulic cylinders.

Generally stated, other types of vehicles (e.g., on-road vehicles) have incorporated remote engine starting features and processes, and such features are also desirable for various off-road (e.g., construction) vehicles as well. Remote starting features can assist in job efficiency by preparing a construction machine ahead of an operator's arrival, for example getting the hydraulic oil and engine temperatures to working levels prior to machine utilization. On particularly hot days the remote startup feature may assist with job efficiency in different ways, for example by starting the engine to cool down the cab, and thereby enabling the operator to better handle machine tools therein.

While remote starting features are conventionally known with respect to vehicles generally, it would be desirable to make such features more available in the specific context of off-road vehicles such as construction vehicles. These types of vehicles and associated applications may typically have safety precautions which essentially prevent conventional remote starting features, or otherwise make such features imprudent or impractical in many cases.

BRIEF SUMMARY

The current disclosure provides an enhancement to conventional systems, at least in part by introducing a novel system and method for a conditional remote starting feature for self-propelled work vehicles.

Exemplary such systems and methods may implement an array of cameras for detecting the surroundings of a work vehicle. An authorized user may be enabled to detect the machine state and any associated pre-conditions for remote start via a camera view application on a remote computing device such as a cell phone. Other automated pre-conditions may be detected and selectively applied with respect to specific work vehicle types and/or applications. For example, if a service door is closed and the surrounding conditions are determined to be suitable then the system is permitted to initiate a remote start process. In another example, if a working tool (e.g., bucket) is on the ground and the bucket position is determined to be suitable then the system is permitted to initiate a remote start process. In yet another example, if an operator cab is tilted as may be the case for skid steer loaders, crawlers, articulated dump trucks, and the like, the system may be configured to determine that the cab is open and accordingly suspends or disables the remote startup process.

A controller as disclosed herein may accordingly utilize information from an onboard camera system regarding vehicle surroundings, service doors, working tools, cab position, and the like, and transmit such vehicle information through telematics to the operator (or other authorized user) via a remote display unit. Such a user may for example request, confirm, and otherwise initiate the remote engine startup process by looking at a machine view application on his/her mobile device and then pressing a start button or equivalent interface tool.

In one embodiment, a remote starting method as disclosed herein is provided for a self-propelled work vehicle comprising at least one work attachment supported from a main frame. A first user input is received comprising a remote startup request associated with the work vehicle from a user device via a communications network. One or more parameters respectively associated with predetermined remote startup conditions are automatically detected, for example responsive to the remote startup request, at least one of the one or more parameters comprising images obtained from cameras arranged with respective fields of vision proximate to the work vehicle. The at least one of the detected one or more parameters are transmitted to the user device via the communications network, responsive to which a second user input may be received and comprising a remote startup confirmation from the user device via the communications network. Responsive to the second user input, an engine startup for the work vehicle is automatically controlled.

In an exemplary aspect according to the above-referenced embodiment, at least another of the one or more automatically detected parameters may correspond to a work vehicle state, wherein the requested engine startup is automatically suspended or disabled when the work vehicle state fails to satisfy at least one of the predetermined remote startup conditions.

In another exemplary aspect according to the above-referenced embodiment, images of one or more doors or panels associated with the work vehicle may be captured, wherein the step of automatically detecting one or more parameters further comprises processing the captured images and automatically determining whether the one or more doors or panels are in respective open positions or closed positions. The requested engine startup may for example be automatically suspended or disabled when the one or more doors or panels are in respective open positions.

In another exemplary aspect according to the above-referenced embodiment, images may be captured of an operator cab associated with the work vehicle, wherein the step of automatically detecting one or more parameters further comprises processing the captured images and automatically determining whether the operator cab is in an open position or a closed position. The requested engine startup may for example be automatically suspended or disabled when the operator cab is in an open position.

In another exemplary aspect according to the above-referenced embodiment, images may be captured of the at least one work attachment, wherein the step of automatically detecting one or more parameters further comprises processing the captured images and automatically determining whether the attachment is in a predetermined starting position. The requested engine startup may for example be automatically suspended or disabled when the attachment is not in the predetermined starting position.

In another exemplary aspect according to the above-referenced embodiment, the automatically detected one or more parameters may comprise an ambient temperature, wherein for example the engine startup for the work vehicle may comprise automatic control of engine speed based in part on the detected ambient temperature.

In another exemplary aspect according to the above-referenced embodiment, the automatically detected one or more parameters may comprise an ambient temperature, wherein for example the engine startup for the work vehicle may comprise automatic climate control of an operator cab based in part on the detected ambient temperature.

In another embodiment as disclosed herein, a remote starting system is provided for a self-propelled work vehicle comprising at least one work attachment supported from a main frame. A plurality of cameras are arranged with respective fields of vision proximate to the work vehicle, and a communications unit configured to exchange messages with a user device via a communications network. A controller is linked to the plurality of cameras and the communications unit, and configured to direct the performance of steps according to the above-referenced method embodiment and optional aspects.

Numerous objects, features and advantages of the embodiments set forth herein will be readily apparent to those skilled in the art upon reading of the following disclosure when taken in conjunction with the accompanying drawings.

DETAILED DESCRIPTION

Referring now to FIGS. 1-11, various embodiments may now be described of an inventive system and method.

Figure 1:
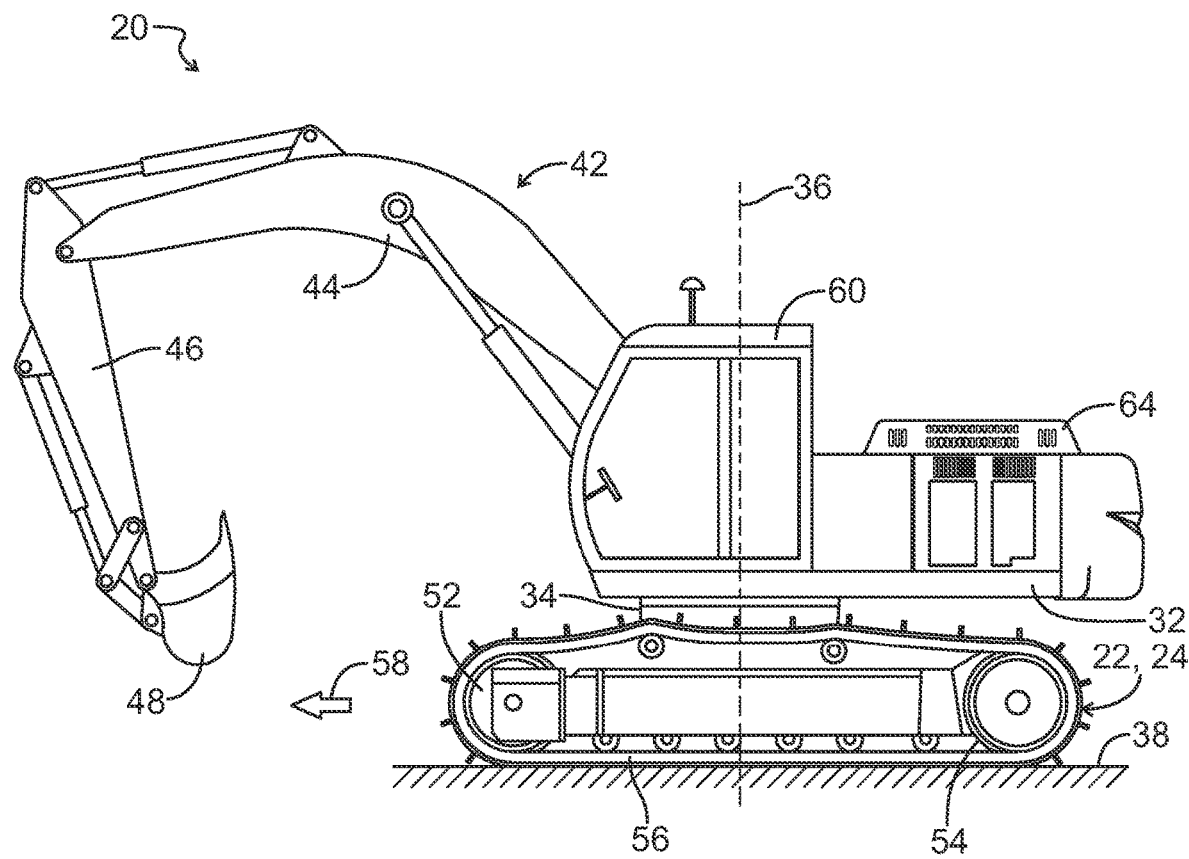
FIG. 1 is a side view of an exemplary embodiment of a self-propelled work vehicle according to the present disclosure.

FIG. 1 in a particular embodiment as disclosed herein shows a representative self-propelled work vehicle 20 in the form of, for example, a tracked excavator machine. The work vehicle 20 includes an undercarriage 22 with first and second ground engaging units 24 driven by first and second travel motors (not shown), respectively.

A main frame 32 is supported from the undercarriage 22 by a swing bearing 34 such that the main frame 32 is pivotable about a pivot axis 36 relative to the undercarriage 22. The pivot axis 36 is substantially vertical when a ground surface 38 engaged by the ground engaging units 24 is substantially horizontal. A swing motor (not shown) is configured to pivot the main frame 32 on the swing bearing 34 about the pivot axis 36 relative to the undercarriage 22.

A work implement 42 in the context of the referenced work vehicle 20 includes a boom assembly 42 with a boom 44, an arm 46 pivotally connected to the boom 44, and a working tool 48. The term "implement" may be used herein to describe the boom assembly (or equivalent thereof) collectively, or individual elements of the boom assembly or equivalent thereof. The boom 44 is pivotally attached to the main frame 32 to pivot about a generally horizontal axis relative to the main frame 32. The working tool in this embodiment is an excavator shovel (or bucket) 48 which is pivotally connected to the arm 46. The boom assembly 42 extends from the main frame 32 along a working direction of the boom assembly 42. The working direction can also be described as a working direction of the boom 44. As described herein, control of the work implement 42 may relate to control of any one or more of the associated components (e.g., boom 44, arm 46, tool 48).

It is within the scope of the present disclosure that the work vehicle 20 may take various alternative forms and further utilize alternative work implements 42 to modify the proximate terrain.

In the embodiment of FIG. 1, the first and second ground engaging units 24 are tracked ground engaging units, although various alternative embodiments of a work vehicle 20 are contemplated wherein the ground engaging units 24 may be wheeled ground engaging units. Each of the tracked ground engaging units 24 includes an idler 52, a drive sprocket 54, and a track chain 56 extending around the idler 52 and the drive sprocket 54. The travel motor of each tracked ground engaging unit 24 drives its respective drive sprocket 54. Each tracked ground engaging unit 24 is represented as having a forward traveling direction 58 defined from the drive sprocket 54 toward the idler 52. The forward traveling direction 58 of the tracked ground engaging units 24 also defines a forward traveling direction 58 of the undercarriage 22 and thus of the work vehicle 20. In some applications, including uphill travel as further discussed below, the orientation of the undercarriage 22 may be reversed such that a traveling direction of the work vehicle 20 is defined from the idler 52 toward its respective drive sprocket 54, whereas the work implement(s) 42 is still positioned ahead of the undercarriage 22 in the traveling direction.

An operator's cab 60 may be located on the main frame 32. The operator's cab 60 and the boom assembly 42 may both be mounted on the main frame 32 so that the operator's cab 60 faces in the working direction 58 of the boom assembly. A control station 62 may be located in the operator's cab 60.

Also mounted on the main frame 32 is an engine 64 for powering the work vehicle 20. The engine 64 may be a diesel internal combustion engine. The engine 64 may drive a hydraulic pump to provide hydraulic power to the various operating systems of the work vehicle 20.

Figure 2:
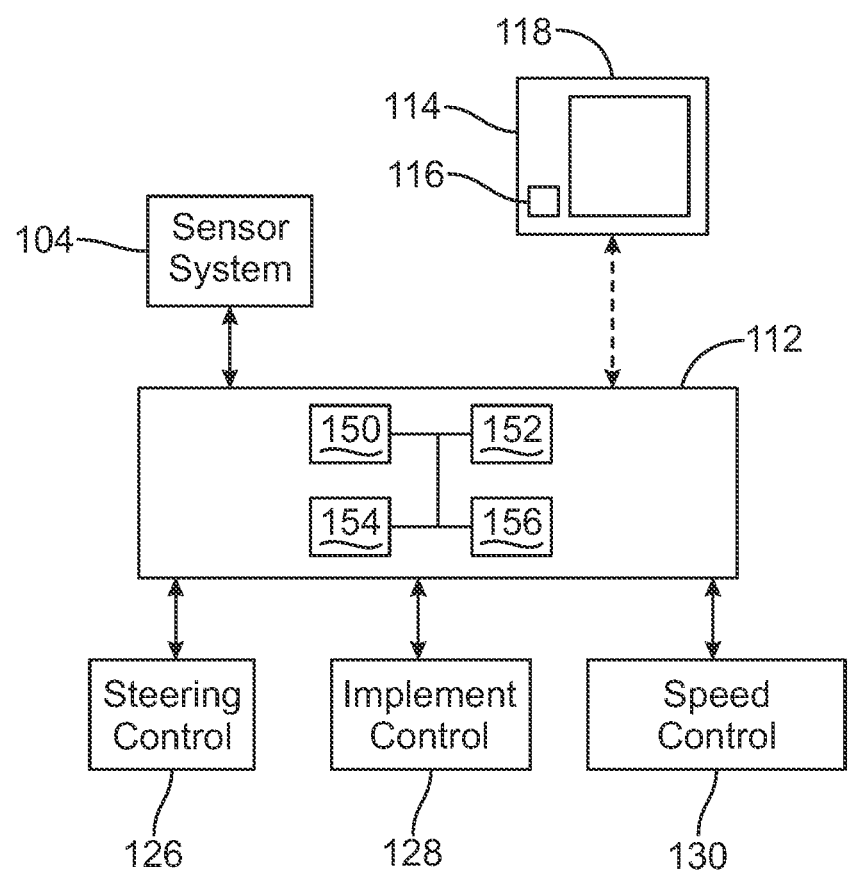
FIG. 2 is a block diagram representing a control system according to an embodiment of the present disclosure.

As schematically illustrated in FIG. 2, the self-propelled work vehicle 20 includes a control system including a controller 112. The controller 112 may be part of the machine control system of the work vehicle 20, or it may be a separate control module.

The controller 112 is configured to receive input signals from some or all of various sensors collectively defining a sensor system 104. Various sensors in the sensor system 104 may typically be discrete in nature, but signals representative of more than one input parameter may be provided from the same sensor, and the sensor system 104 may further refer to signals provided from the machine control system.

In particular embodiments as described in more detail below, and with illustrative reference to FIG. 3, the sensor system 104 may be referred to as a camera system including a plurality of imaging devices such as cameras 104a, 104b, 104c mounted on the main frame 32 of the self-propelled work vehicle 20 and arranged to capture images corresponding to surroundings of the self-propelled work vehicle 20. The camera system 104 may include video cameras configured to record an original image stream and transmit corresponding data to the controller 112. In the alternative or in addition, the camera system 104 may include one or more of an infrared camera, a stereoscopic camera, a PMD camera, or the like. The number and orientation of said cameras may vary in accordance with the type of work vehicle and relevant applications. In the illustrated embodiment of FIG. 3, by further reference to FIGS. 4 and 5, a first camera 104a is positioned on a left side of the work vehicle 20 and configured to capture images in a field of view 106a, a second camera 104b is positioned on a rear side of the work vehicle 20 and configured to capture images in a field of view 106b, and a third camera 104c is positioned on a right side of the work vehicle 20 and configured to capture images in a field of view 106c. The position and size of an image region recorded by a respective camera 104a, 104b, 104c may depend on the arrangement and orientation of the camera and the camera lens system, and a particular such arrangement and/or orientation is not required within the scope of the present disclosure unless otherwise specifically noted.

Figure 3:
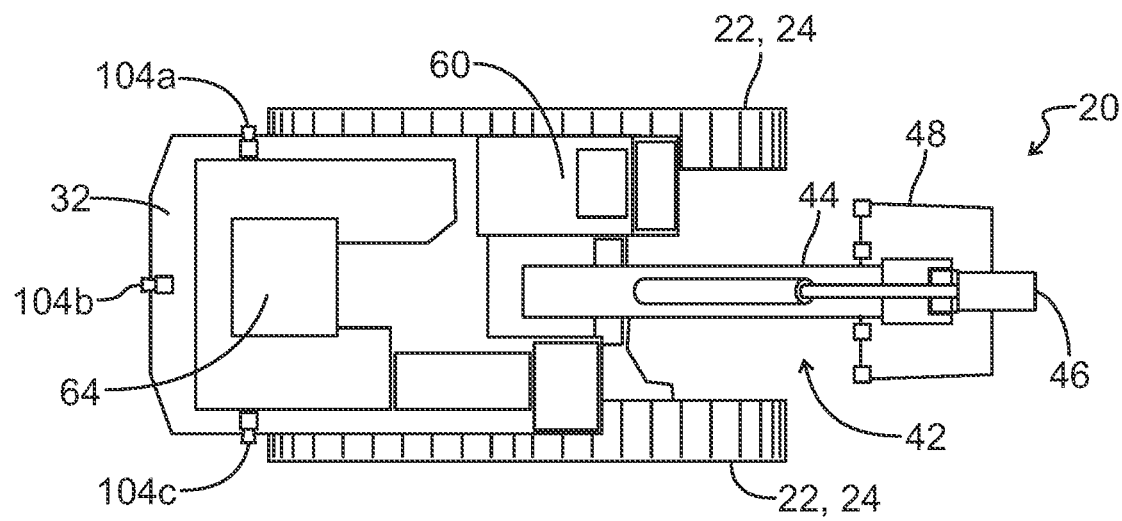
FIG. 3 is an overhead view of the work vehicle of FIG. 1, representing exemplary camera positions for capturing images of the surroundings of the work vehicle.
Figure 4:
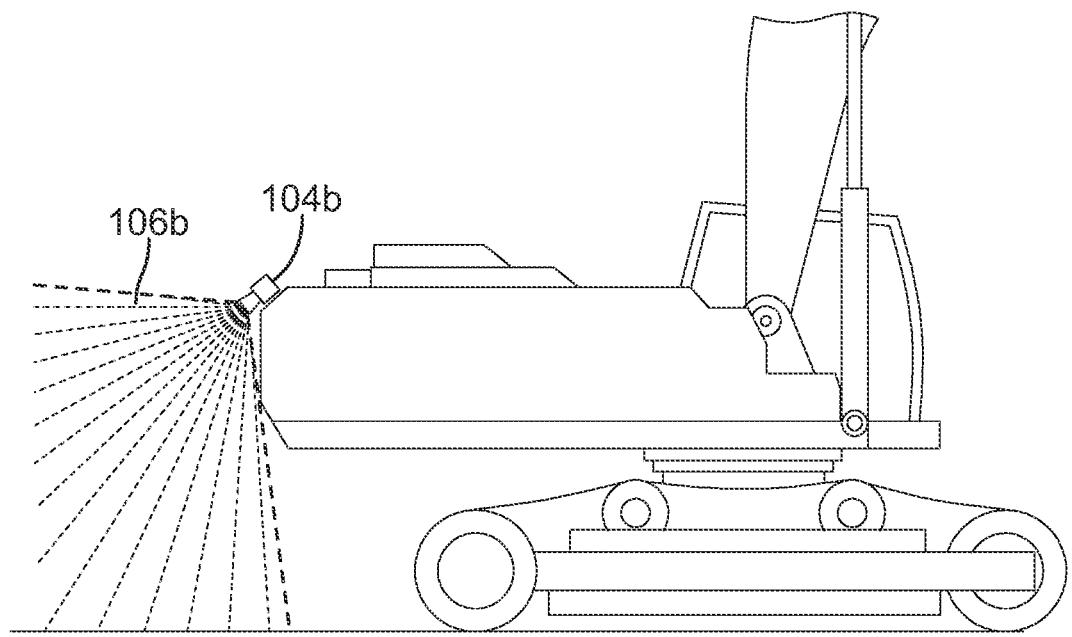
FIG. 4 is a partial side view of the work vehicle of FIG. 1, representing an exemplary field of view for a rear-mounted camera.
Figure 5:
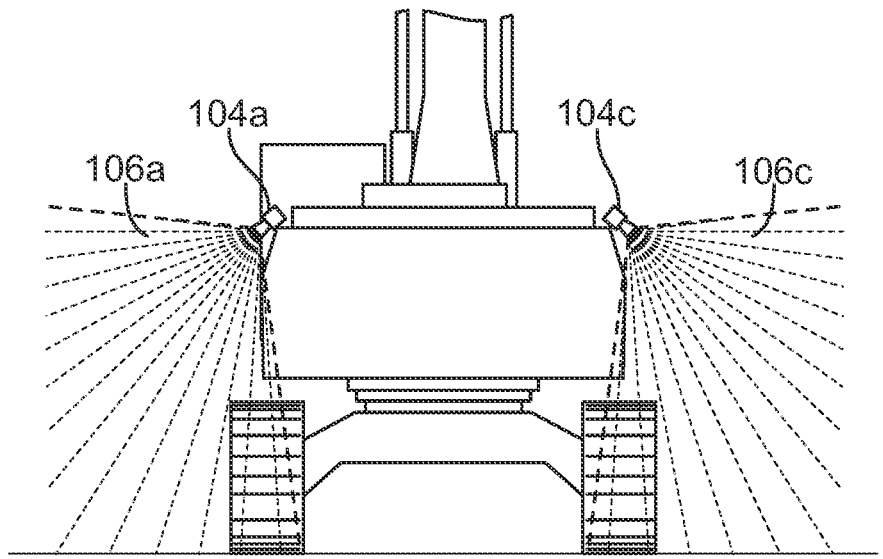
FIG. 5 is a partial rear view of the work vehicle of FIG. 1, representing exemplary fields of view for side-mounted cameras.
Figure 6:
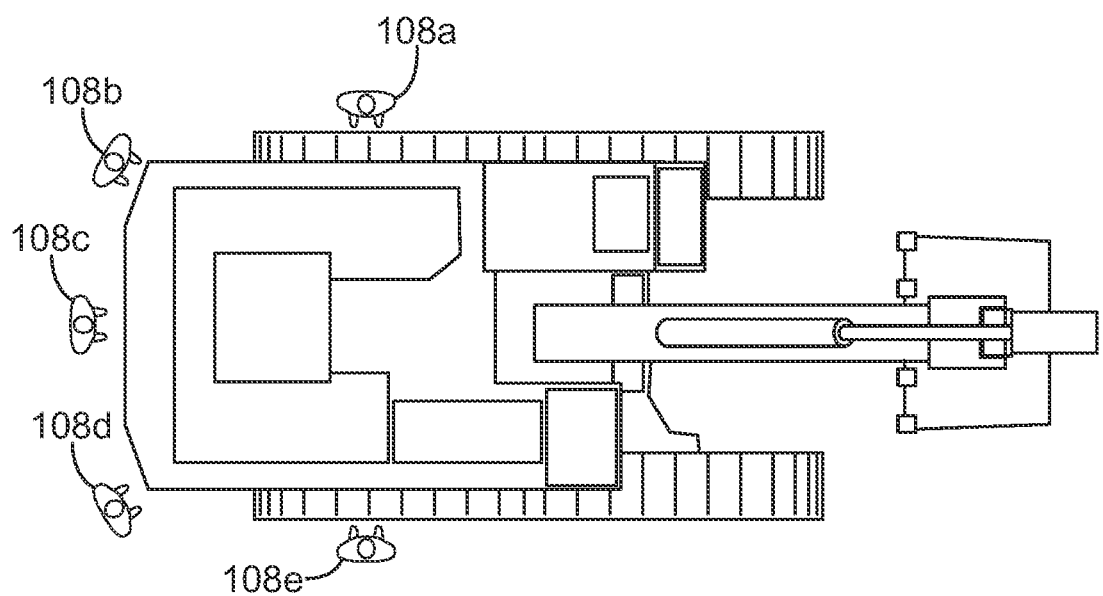
FIG. 6 is an overhead view of the work vehicle of FIG. 1, representing exemplary standing positions of humans in the surroundings of the work vehicle.
Figure 7:
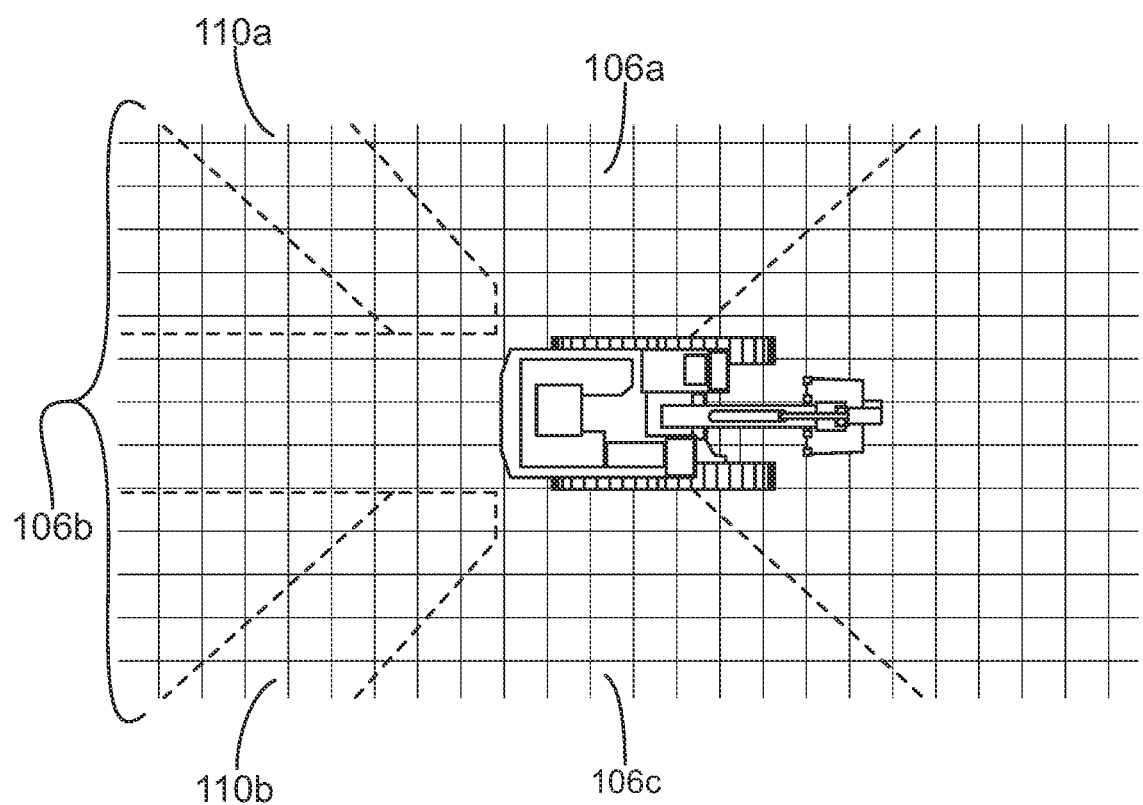
FIG. 7 is the overhead view of FIG. 6, representing fields of view and blind spots corresponding to the exemplary camera positions of FIG. 3.
Figure 8:
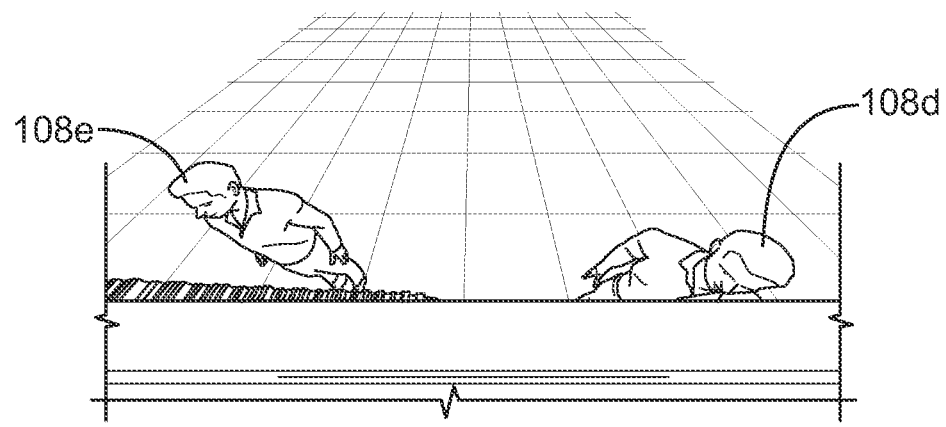
FIG. 8 is a perspective view representing images captured from a first camera and including humans in the exemplary standing positions of FIG. 6.
Figure 9:
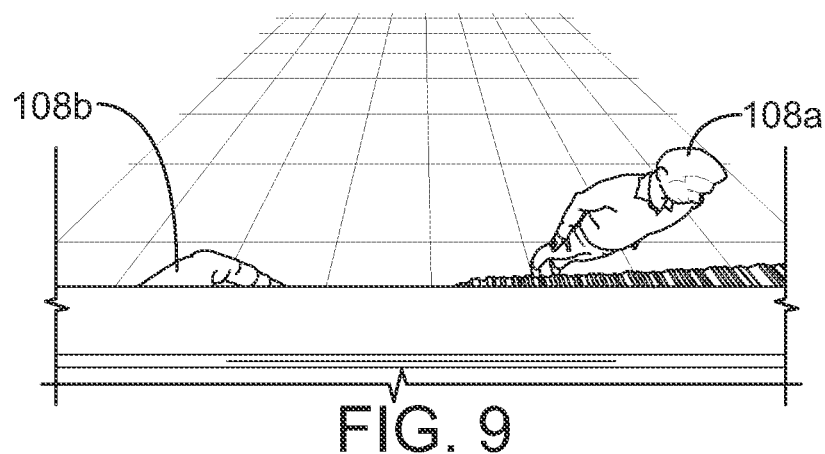
FIG. 9 is a perspective view representing images captured from a second camera and including humans in the exemplary standing positions of FIG. 6.
Figure 10:
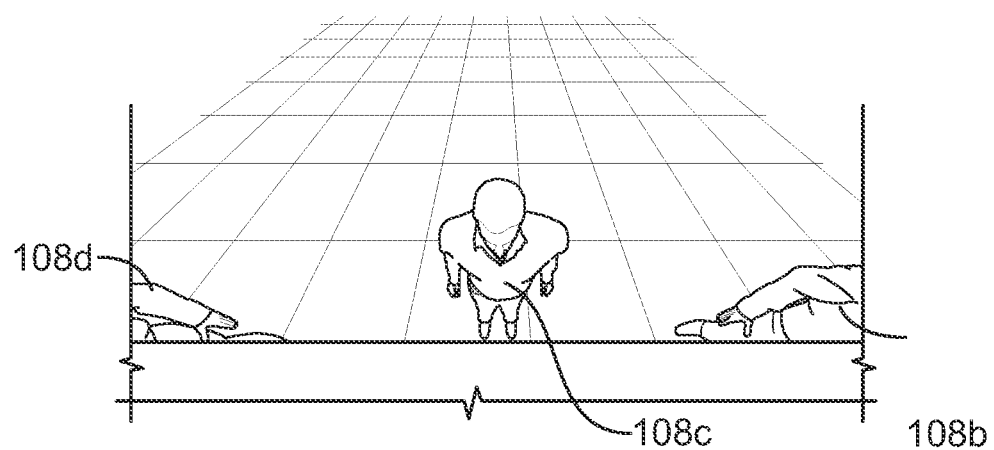
FIG. 10 is a perspective view representing images captured from a third camera and including humans in the exemplary standing positions of FIG. 6.

In an embodiment, the respective cameras 104a, 104b, 104c may be placed substantially as shown in FIGS. 3-5 and tilted approximately 45 degrees downward, with a horizontal field of view of approximately 115 degrees and a vertical field of view of approximately 86 degrees. In such an embodiment, the respective fields of view 106a, 106b, 106c may correspond with those represented in FIG. 7. The described arrangement and fields of view have associated blind spots 110a and 110b there between, but such blind spots may be acceptable as not corresponding with dangerous locations for human operators during a engine startup process. For example, with such an array of cameras 104a, 104b, 104c, further for illustrative purposes arranging a plurality of humans 108a, 108b, 108c, 108d, 108e or proxies thereof (e.g., mannequins) in the surroundings of the work vehicle 20 as shown in FIG. 6, captured images from the respective cameras may for example correspond to those represented in FIG. 8 (i.e., from camera 104c), FIG. 9 (i.e., from camera 104a), and FIG. 10 (i.e., from camera 104b). As shown, all five of the exemplary human forms 108a-108e are at least partially included in the captured images.

In embodiments within the scope of the present disclosure, a user interface associated with for example a telematics platform may be configured to display any one or more of the captured images simultaneously, user-selectively, in accordance with an automated selection based on priority for a given identified object in the image, and the like.

The sensor system 104 may in various embodiments further include other sensors as known in the art for use with different types of work vehicles 20, such as for example inertial measurement units (IMUs) mounted to respective components of the work implement 42 and/or main frame 32, sensors coupled to piston-cylinder units to detect the relative hydraulically actuated extensions thereof, or any known alternatives as may be known to those of skill in the art. In various embodiments, additional sensors may be provided to detect machine operating conditions or positioning, including for example an orientation sensor, global positioning system (GPS) sensors, vehicle speed sensors, and the like, and whereas one or more of these sensors may be discrete in nature the sensor system may further refer to signals provided from the machine control system. In an embodiment, any of the aforementioned sensors may be supplemented using radio frequency identification (RFID) devices or equivalent wireless transceivers on one or more components of the work implement 42, the main frame 32, or the like. Such devices may for example be implemented to determine and/or confirm a distance and/or orientation between the respective work vehicle component and an external object. Still further sensors may be incorporated which generate output signals corresponding to a specific work vehicle condition, such as for example whether a door or panel is open or closed.

Other sensors may collectively define an obstacle detection system (not shown), alone or in combination with one or more aforementioned sensors for improved data collection, various examples of which may include ultrasonic sensors, laser scanners, radar wave transmitters and receivers, thermal sensors, imaging devices, structured light sensors, other optical sensors, and the like. The types and combinations of sensors for obstacle detection may vary for a type of work vehicle, work area, and/or application, but generally may be provided and configured to optimize recognition of objects proximate to, or otherwise in association with, a determined working area of the vehicle.

Returning to FIGS. 1 and 2, the controller 112 may be configured to produce outputs, as further described below, to a user interface 114 associated with a remote computing device 118 for display to the human operator. Also as further described below, the controller 112 may be configured to receive inputs from the remote computing device 118, such as user input provided via the user interface 114.

An exemplary user interface 114 as disclosed herein may be associated with a program application generating a display on a remote computing device 118 such as a cell phone or tablet computer including a display unit, for example a touchscreen interface. The user interface 114 may selectively display outputs such as captured images and status indications and/or otherwise enable user interaction such as the providing of inputs to the system. Such inputs may be provided via interface tools 116 such as buttons or the like associated with the user interface 114, such as for example rendered as part of a touchscreen display or otherwise as a discrete input/output device 116. In the context of a remote user interface 114 as generally described herein, data transmission between for example the vehicle control system and the user interface 114 may take the form of a wireless communications system and associated components as are conventionally known in the art. In certain embodiments, a remote user interface 114 and vehicle control systems for respective work vehicles 20 may be further coordinated or otherwise interact with a remote server or other computing device for the performance of operations in a system as disclosed herein.

The controller 112 may in various embodiments be configured to generate control signals for controlling the operation of respective actuators, or signals for indirect control via intermediate control units, associated with a machine steering control system 126, a machine implement control system 128, and an engine speed control system 130. The control systems 126, 128, 130 may be independent or otherwise integrated together or as part of a machine control unit in various manners as known in the art. The controller 112 may for example generate control signals for controlling the operation of various actuators, such as hydraulic motors or hydraulic piston-cylinder units (not shown), and electronic control signals from the controller 112 may actually be received by electro-hydraulic control valves associated with the actuators such that the electro-hydraulic control valves will control the flow of hydraulic fluid to and from the respective hydraulic actuators to control the actuation thereof in response to the control signal from the controller 112.

The controller 112 includes or may be associated with a processor 150, a computer readable medium 152, a communication unit 154, and data storage 156 such as for example a database network. It is understood that the controller 112 described herein may be a single controller having some or all of the described functionality, or it may include multiple controllers wherein some or all of the described functionality is distributed among the multiple controllers.

Various operations, steps or algorithms as described in connection with the controller 112 can be embodied directly in hardware, in a computer program product such as a software module executed by the processor 150, or in a combination of the two. The computer program product can reside in RAM memory, flash memory, ROM memory, EPROM memory, EEPROM memory, registers, hard disk, a removable disk, or any other form of computer-readable medium 152 known in the art. An exemplary computer-readable medium 152 can be coupled to the processor 150 such that the processor 150 can read information from, and write information to, the memory/storage medium 152. In the alternative, the medium 152 can be integral to the processor 150. The processor 150 and the medium 152 can reside in an application specific integrated circuit (ASIC). The ASIC can reside in a user terminal. In the alternative, the processor 150 and the medium 152 can reside as discrete components in a user terminal.

The term "processor" 150 as used herein may refer to at least general-purpose or specific-purpose processing devices and/or logic as may be understood by one of skill in the art, including but not limited to a microprocessor, a microcontroller, a state machine, and the like. A processor 150 can also be implemented as a combination of computing devices, e.g., a combination of a DSP and a microprocessor, a plurality of microprocessors, one or more microprocessors in conjunction with a DSP core, or any other such configuration.

The communication unit 154 may support or provide communications between the controller 112 and external systems or devices, and/or support or provide communication interface with respect to internal components of the self-propelled work vehicle 20. The communications unit may include wireless communication system components (e.g., via cellular modem, WiFi, Bluetooth or the like) and/or may include one or more wired communications terminals such as universal serial bus ports.

The data storage 156 as further described below may, unless otherwise stated, generally encompass hardware such as volatile or non-volatile storage devices, drives, electronic memory, and optical or other storage media, as well as in certain embodiments one or more databases residing thereon.

Figure 11:
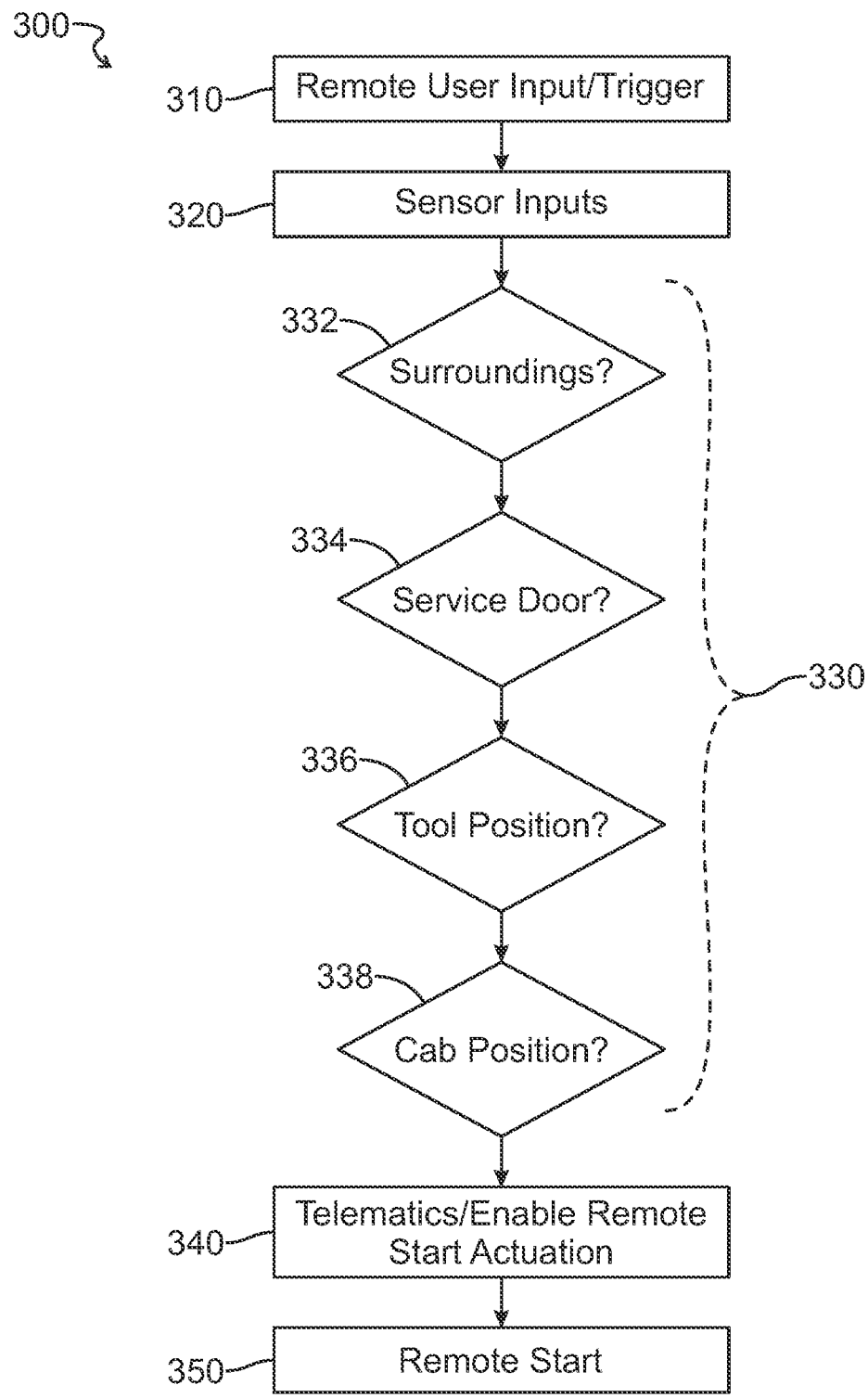
FIG. 11 is a flowchart representing an exemplary remote start method according to an embodiment of the present disclosure.

Referring next to FIG. 11, with further illustrative reference back to FIGS. 3-10, an embodiment of a method 300 may now be described which is exemplary but not limiting on the scope the present disclosure unless otherwise specifically noted. One of skill in the art may appreciate that alternative embodiments may include fewer or additional steps, and that certain disclosed steps may for example be performed in different chronological order or simultaneously.

In step 310, the system may receive a message including a remote start request, or an equivalent trigger for subsequent steps of the remote start method. The message may typically be initiated from a remote location such as for example via a mobile computing device associated with an authorized user. An interface associated with the mobile computing device may for example be associated with a telematics platform providing work vehicle information, wherein the remote start functionality and messaging as disclosed herein are supplementing conventional mobile applications or the like. The message may accordingly be transmitted via a communications network to a local controller associated with the work vehicle and/or to a separate server or control unit which may for example be configured to direct among other things a remote start process for a plurality of work vehicles.

In various embodiments, the initial message including the remote start request may be actively generated by a user via the user interface and may further or in the alternative be passively generated. For example, a proximity determination may be made with respect to the work vehicle and the mobile computing device associated with the authorized user, wherein a passive message including the remote start request is automatically generated when the mobile computing device enters a predetermined proximity with respect to the work vehicle. The predetermined proximity may for example correspond to an expected amount of time for a work vehicle startup process (e.g., engine speed startup, climate control, etc.) to be substantially completed.

In step 320, sensor inputs such as for example from camera system 104 are captured in response to the remote start request. In various embodiments, the camera system 104 may be configured to continuously capture images which are only processed in accordance with a remote start process upon receipt of the remote start request. Alternatively, the camera system 104 may be configured to only capture certain images for processing upon a trigger corresponding to the remote start request.

In step 330, the method 300 may include processing the sensor inputs and/or transmit messages comprising certain sensor inputs for determining whether a remote start process is appropriate based on current conditions associated with the work vehicle. Automated image processing functions using for example image segmentation algorithms are known in the art and may fall within the scope of the present disclosure without further discussion herein. In the description that follows, reference may be made to one or more predetermined conditions for remote startup which may include prerequisite conditions that must be satisfied or conditions which upon detection may cause the system to automatically suspend or disable the remote startup process. One or more of the predetermined conditions may in certain embodiments be programmed into the system and/or may be user selectable for a given application or type of work vehicle.

In various embodiments, processing of images from an image sensor may be performed at a respective camera via an associated processing unit wherein only relevant data is captured from the image and forwarded to a controller 112, server, or other computing device, or the image processing may be performed at the controller 112, server, or other external processing unit alongside the other processing steps, for example with respect to the predetermined conditions.

If the system automatically suspends or disables the remote startup process, in some embodiments it may further generate feedback to the user interface providing information and/or alerts regarding the reasons for said suspension or disabling of the process.

As one example, the method may determine in a sub-step 332 whether the surroundings of the work vehicle are appropriately clear to safely permit a remote engine startup. In certain embodiments such a sub-step 332 may be omitted if there are no automated processing steps with respect to objects in the surroundings of the work vehicle, but otherwise such automated processing may for example be treated as complementary or supplemental to a manual review of such images. In an embodiment, an object detection algorithm may be configured to override a remote start request, even upon manual approval from a remote location, and suspend or disable the remote start process if the surroundings of the work vehicle are deemed unsafe or otherwise outside of predetermined conditions for remote start. The controller 112 or an analogous portion of an overall control system may accordingly be configured to analyze images for one or more objects in the surroundings of the work vehicle, to classify said one or more objects if needed, and to further determine whether any of the detected one or more objects merit suspension or disabling of the remote start process. Such determinations may be made based on one or more of a type of object detected, a location of the object, an observed motion of the object, and the like. For example, an object such as a person in close proximity to the work vehicle may be acceptable in one location but may be unacceptable for remote start process initiation in a different location about the work vehicle, possibly depending on the type of work vehicle.

As another example, the method may determine in a sub-step 334 whether a service door and/or other equivalent door or panel is open when it should be closed based on predetermined conditions for remote startup. In an embodiment, such a determination may be made automatically based on images captured from one or more cameras directed toward the work vehicle or otherwise having respective fields of view which comprise a relevant portion of the work vehicle. In other embodiments, such a determination may instead or further be made automatically based on other sensor inputs corresponding to a closed position of the service door, or a lack thereof.

As another example, the method may determine in a sub-step 336 whether one or more components of the work implement are in an appropriate position based on predetermined conditions for remote startup. For example, such a predetermined condition may include ensuring that the bucket of an excavator as the work vehicle is appropriately positioned in contact with the ground surface. In an embodiment, such a determination may be made automatically based on images captured from one or more cameras directed toward the work implement or otherwise having respective fields of view which comprise a relevant portion of the work implement. In other embodiments, such a determination may instead or further be made automatically based on other sensor inputs corresponding to a position of the work implement, such as may for example be provided using position sensors mounted on one or more components of the work implement in a manner known in the art.

As another example, the method may determine in a sub-step 338 whether the operator cab is in an appropriate position based on predetermined conditions for remote startup. For example, in certain types of work vehicles (e.g., skid steer loaders) the operator cab may be selectively tilted in a manner that may violate a predetermined condition for remote startup. In an embodiment, such a determination may be made automatically based on images captured from one or more cameras directed toward the work vehicle or otherwise having respective fields of view which comprise a relevant portion of the work vehicle. In other embodiments, such a determination may instead or further be made automatically based on other sensor inputs corresponding to a closed position of the operator cab, or a lack thereof.

In step 340, the system may transmit messages including for example captured images of the work vehicle and/or surroundings of the work vehicle for user review of the work vehicle conditions and further enable remote start actuation. In an embodiment, interaction between the system and the user may be implemented using for example a fleet management or analogous remote device-based telematics platform as otherwise conventionally known in the art but further modified in accordance with the present disclosure to accommodate the remote start request, image display, work vehicle condition review, and user feedback for example corresponding to an authorization of remote start actuation.

In step 350, upon receiving user confirmation that the work vehicle conditions are appropriate for a remote startup, assuming that the system has not otherwise identified conditions requiring an override of the user authorization/confirmation, the controller 112 may direct the performance of a remote startup process.

In one example, the controller 112 may direct engine startup in one or more stages. For example, an automated hydraulic oil warmup process may be implemented as part of the remote startup, wherein engine speed is regulated among one or more of a low-idle, mid-idle, and high-idle operating state dependent on a sensed oil temperature and/or pump pressure, a sensed ambient temperature, a type of work vehicle, or the like. In an embodiment utilizing such relationships, target engine speeds (idle states) corresponding to threshold oil temperatures may for example be set by the user as part of the remote start request or may be programmed otherwise and retrieved as part of the remote startup process.

In another example, the controller 112 may direct a climate control process as part of the remote startup, for example at least in part to achieve a preset temperature in the operator cab. The preset temperature may be a target set by the user as part of the remote start request or may be programmed otherwise and retrieved as part of the remote startup process. The preset temperature may further be compared against a sensed ambient temperature within the operator cab to produce an error signal for temperature control, for example via a heating or air conditioning unit.

In an embodiment, certain aspects of a remote startup process may be implemented after a remote start request while other aspects of the remote startup process may be suspended or disabled for the same request. Using the above-referenced examples, an engine startup may be initiated upon confirmation from the user while a climate control process which would otherwise be included in the remote startup as per selected parameters may be suspended because of current sensed conditions in or in association with the operator cab.

In an embodiment, functions to be performed in association with a remote startup process may be selectable by the user as part of the trigger message, or otherwise preselected via the user interface as a recurring list of features for all such remote startup requests. For example, a list of available remote start functions may be presented to the user alongside a portion of the user interface enabling transmittal of a message including a remote start request, or such a list may be separately presented in a different portion of the user interface.

The method 300 may in additional steps (not shown) or otherwise as part of step 350 provide continuous feedback to the user interface via the communications network regarding a status of the remote startup. For example, a current engine speed and/or an ambient temperature inside the operator's cab may be monitored and displayed to the user during the startup process or otherwise until or unless turned off by the user.

As used herein, the phrase "one or more of," when used with a list of items, means that different combinations of one or more of the items may be used and only one of each item in the list may be needed. For example, "one or more of" item A, item B, and item C may include, for example, without limitation, item A or item A and item B. This example also may include item A, item B, and item C, or item B and item C.

One of skill in the art may appreciate that when an element herein is referred to as being "coupled" to another element, it can be directly connected to the other element or intervening elements may be present.

Thus, it is seen that the apparatus and methods of the present disclosure readily achieve the ends and advantages mentioned as well as those inherent therein. While certain preferred embodiments of the disclosure have been illustrated and described for present purposes, numerous changes in the arrangement and construction of parts and steps may be made by those skilled in the art, which changes are encompassed within the scope and spirit of the present disclosure as defined by the appended claims. Each disclosed feature or embodiment may be combined with any of the other disclosed features or embodiments.

What is claimed is:

1. A remote starting method for a self-propelled work vehicle comprising at least one work attachment supported from a main frame, the method comprising:
based on an expected amount of time for a defined engine startup, predetermining a corresponding proximity threshold between a first user device and the work vehicle;
upon determining that the first user device is within the predetermined proximity from the work vehicle, automatically generating a remote startup request associated with the work vehicle;
automatically detecting one or more parameters respectively associated with predetermined remote startup conditions, at least one of the one or more parameters comprising images obtained from cameras arranged with respective fields of vision proximate to the work vehicle;
transmitting the at least one of the detected one or more parameters to a user interface associated with the user device via the communications network;
receiving user input comprising a remote startup confirmation from the user interface associated with the user device via the communications network, and responsive to the transmitted at least one of the detected one or more parameters; and
responsive to the user input, automatically controlling an engine startup for the work vehicle,
wherein the defined engine startup comprises a preselection via the user interface of functions to be performed during engine startup, wherein selectable functions to be performed comprise a plurality of engine speed operating states, and wherein progression between engine speed operating states is dependent on at least a sensed oil temperature.

2. The remote starting method of claim 1, wherein at least another of the one or more automatically detected parameters corresponds to a work vehicle state, wherein the requested engine startup is automatically suspended or disabled when the work vehicle state fails to satisfy at least one of the predetermined remote startup conditions.

3. The remote starting method of claim 1, further comprising capturing images of one or more doors or panels associated with the work vehicle, and wherein the step of automatically detecting one or more parameters further comprises processing the captured images and automatically determining whether the one or more doors or panels are in respective open positions or closed positions, wherein the requested engine startup is automatically suspended or disabled when the one or more doors or panels are in respective open positions.

4. The remote starting method of claim 1, further comprising capturing images of an operator cab associated with the work vehicle, and wherein the step of automatically detecting one or more parameters further comprises processing the captured images and automatically determining whether the operator cab is in an open position or a closed position, wherein the requested engine startup is automatically suspended or disabled when the operator cab is in an open position.

5. The remote starting method of claim 1, further comprising capturing images of the at least one work attachment, and wherein the step of automatically detecting one or more parameters further comprises processing the captured images and automatically determining whether the attachment is in a predetermined starting position, wherein the requested engine startup is automatically suspended or disabled when the attachment is not in the predetermined starting position.

6. The remote starting method of claim 1, wherein the automatically detected one or more parameters comprise an ambient temperature, and the engine startup for the work vehicle comprises automatic control of engine speed based in part on the detected ambient temperature.

7. The remote starting method of claim 1, wherein the automatically detected one or more parameters comprise an ambient temperature, and the engine startup for the work vehicle comprises automatic climate control of an operator cab based in part on the detected ambient temperature.

8. The remote starting method of claim 1, wherein the expected amount of time corresponds at least in part to the plurality of engine speed operating states, further in view of a sensed ambient temperature.

9. The remote starting method of claim 8, wherein selectable functions to be performed comprise a climate control target in an operator cab of the work vehicle, and wherein the expected amount of time further accounts for a sensed ambient temperature in the operator cab.

10. A remote starting system for a self-propelled work vehicle comprising at least one work attachment supported from a main frame, the remote starting system comprising:
a plurality of cameras arranged with respective fields of vision proximate to the work vehicle;
a communications unit configured to exchange messages with a user device via a communications network;
a controller configured to:
based on an expected amount of time for a defined engine startup, predetermine a corresponding proximity threshold between the user device and the work vehicle;
upon determining that the user device is within the predetermined proximity from the work vehicle, automatically generate a remote startup request associated with the work vehicle;
automatically detect one or more parameters respectively associated with predetermined remote startup conditions, at least one of the one or more parameters comprising images obtained from the plurality of cameras;
transmit the at least one of the detected one or more parameters to a user interface associated with the user device via the communications network;
receive user input comprising a remote startup confirmation from the user interface associated with the user device via the communications network, and responsive to the transmitted at least one of the detected one or more parameters; and
responsive to the user input, automatically control an engine startup for the work vehicle,
wherein the defined engine startup comprises a preselection via the user interface of functions to be performed during engine startup, wherein selectable functions to be performed comprise a plurality of engine speed operating states, and wherein progression between engine speed operating states is dependent on at least a sensed oil temperature.

11. The remote starting system of claim 10, wherein at least another of the one or more automatically detected parameters corresponds to a work vehicle state, and wherein the controller is configured to automatically suspend or disable the requested engine startup is when the work vehicle state fails to satisfy at least one of the predetermined remote startup conditions.

12. The remote starting system of claim 10, further comprising one or more cameras configured to capture images of one or more doors or panels associated with the work vehicle, and wherein the controller is configured to process the captured images and automatically determine whether the one or more doors or panels are in respective open positions or closed positions, wherein the requested engine startup is automatically suspended or disabled when the one or more doors or panels are in respective open positions.

13. The remote starting system of claim 10, further comprising one or more cameras configured to capture images of an operator cab associated with the work vehicle, and wherein the controller is configured to process the captured images and automatically determine whether the operator cab is in an open position or a closed position, wherein the requested engine startup is automatically suspended or disabled when the operator cab is in an open position.

14. The remote starting system of claim 10, further comprising one or more cameras configured to capture images of the at least one work attachment, and wherein the controller is configured to process the captured images and automatically determine whether the attachment is in a predetermined starting position, wherein the requested engine startup is automatically suspended or disabled when the attachment is not in the predetermined starting position.

15. The remote starting system of claim 10, further comprising a sensor configured to generate output signals corresponding to an ambient temperature, wherein the automatically detected one or more parameters comprise the ambient temperature, and the engine startup for the work vehicle comprises automatic control of engine speed based in part on the detected ambient temperature.

16. The remote starting system of claim 10, further comprising a sensor configured to generate output signals corresponding to an ambient temperature, and the engine startup for the work vehicle comprises automatic climate control of an operator cab based in part on the detected ambient temperature.

17. The remote starting system of claim 10, wherein the expected amount of time corresponds at least in part to the plurality of engine speed operating states, further in view of a sensed ambient temperature.

18. The remote starting system of claim 17, wherein selectable functions to be performed comprise a climate control target in an operator cab of the work vehicle, and wherein the expected amount of time further accounts for a sensed ambient temperature in the operator cab.

* * * * *